United States Patent [19]

Tonomura et al.

[11] 4,349,834
[45] Sep. 14, 1982

[54] CHROMA SIGNAL GAIN CONTROL CIRCUIT

[75] Inventors: Kenichi Tonomura, Tachikawa; Kyoichi Takahashi, Kodaira; Makoto Furihata, Tachikawa, all of Japan

[73] Assignees: Hitachi, Ltd.; Hitachi Microcomputer Engineering Ltd., both of Tokyo, Japan

[21] Appl. No.: 237,898

[22] Filed: Feb. 25, 1981

[30] Foreign Application Priority Data

Mar. 12, 1980 [JP] Japan .................. 55-30375

[51] Int. Cl.$^3$ ............................ H04N 9/535
[52] U.S. Cl. ....................................... 358/27
[58] Field of Search ......................... 358/27

[56] References Cited

U.S. PATENT DOCUMENTS

| | | | |
|---|---|---|---|
| 3,141,064 | 7/1964 | Macovski | 358/27 |
| 3,836,708 | 9/1974 | Meki et al. | 358/27 |
| 4,101,927 | 7/1978 | Isono et al. | 358/27 |

Primary Examiner—Richard Murray
Attorney, Agent, or Firm—Craig and Antonelli

[57] ABSTRACT

A chroma signal gain control circuit is constructed to include a first band pass amplifier, a second band pass amplifier, a burst gate circuit, a switch circuit and an ACC detecting circuit. The output signal of the first band pass amplifier is fed to the input of the second band pass amplifier, the output signal of which is fed to the input of the burst gate circuit. The switch circuit selectively transmits either the output of the burst gate circuit or the output of the second band pass amplifier to the ACC detecting circuit. The gain of the first band pass amplifier is controlled by feeding the detected output of the ACC detecting circuit to the first band pass amplifier. In order to prevent over-saturation in case the level ratio (C/B) between the color burst signal and the chroma signal exceeds a predetermined value, the switch circuit will selectively transmit the output of the second band pass amplifier to the ACC detecting circuit.

10 Claims, 3 Drawing Figures

FIG. 1
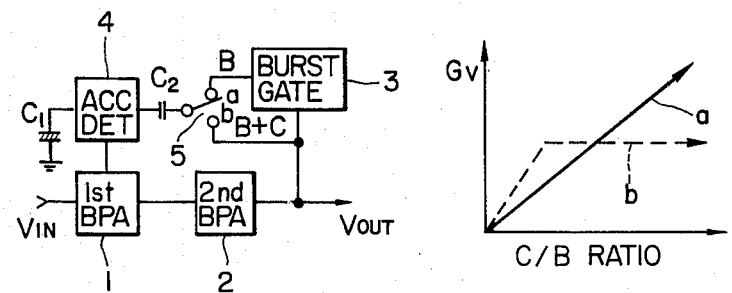
FIG. 2
FIG. 3
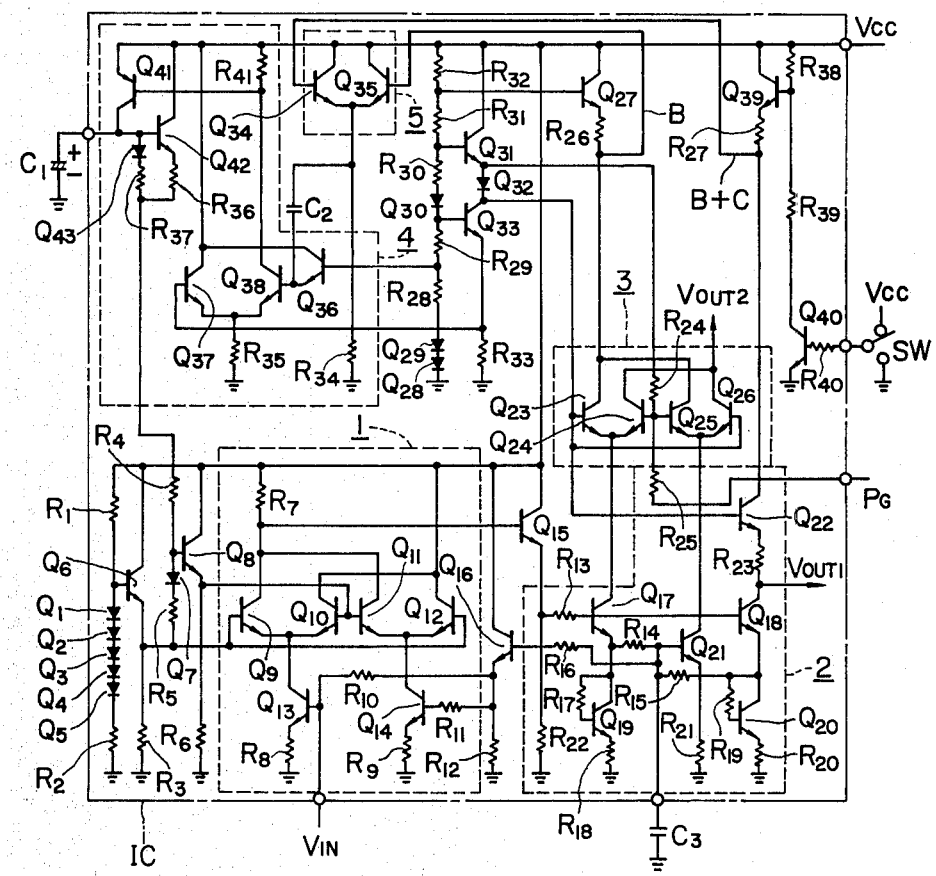

CHROMA SIGNAL GAIN CONTROL CIRCUIT

BACKGROUND OF THE INVENTION

The present invention relates to a chroma signal gain control circuit for use in a color television receiving circuit.

In a color television receiving circuit, if the level difference between the brightness signal and the carrier chroma signal takes place due to the fading or the mismatching of the antenna circuit, the chroma saturation factor (or simply the chroma) may sometimes be changed. Thus, an Automatic Chroma Control (ACC) circuit for automatically controlling the changes in the chroma saturation factor to hold the carrier chroma signal at a predetermined level has been typically used, as well known in the relevant art.

In this ACC circuit, the color burst signal level inserted at a predetermined level is extracted to control the gain of a band pass amplifier such that the color burst signal level may be constant. Therefore, an accurate chroma saturation factor can be attained by the aforementioned ACC circuit so long as the color burst signal and the chroma signal are supplied at a predetermined level ratio.

However, the level ratio of the color burst signal to the chroma signal is frequently changed due to noise in the broadcasting network system or the reinsertion of the color burst signal at a local station. Therefore, if the burst signal level is relatively attenuated, for example, the gain of the band pass amplifier is so controlled as to make that signal level constant, thus inviting a problem in that the gain for the chroma signal is so increased that the band pass amplifier is oversaturated to invite a distortion of the signal.

With this in mind, there has been disclosed in Japanese Laid-Open Patent Publication No. 49-57725 an ACC circuit having a first band pass amplifier, in which there is provided at the input of the first band pass amplifier an average value detecting circuit for detecting the average level of the input, and in which there is added a threshold circuit for judging when the output peak level of a second band pass amplifier becomes higher than the detected average level thereby to control the gain of the second band pass amplifier so that the output carrier chroma signal level may be constant, whereby the aforementioned disadvantage relating to over-saturation of the amplifier is obviated.

There is also proposed in Japanese Laid-Open Patent Publication No. 53-134325, another circuit in which the first and second band pass amplifiers are equipped with ACC circuits, respectively, with the ACC circuit of the second band pass amplifier serving to decrease the gain of a second amplified band pass output when this second amplified band pass output has either strong noises or an excessive signal level, whereby the aforementioned disadvantage relating to the over-saturation of the amplifier or the like is obviated.

SUMMARY OF THE INVENTION

According to our investigations it has been found that the foregoing two prior art circuits have the following problems:

(1) Since, in either of the aforementioned circuits, the second band pass amplifier is made to have a gain control function and requires two detecting circuits (for detecting both the average value and the peak value), the resultant drawbacks are that the circuit is complicated and that the number of external terminals for an external condenser constituting the aforementioned detecting circuits and for a coupling condenser to be provided at the inputs of the detecting circuits is increased when the circuits are to be monolithically integrated.

(2) The coupling condenser can be monolithically integrated because of the capacity of an MOS(Metal-Oxide-Semiconductor) but requires a large occupation area so that the degree of integration is reduced resulting in an increase in the production cost.

Since the aforementioned circuit has an intrinsic deviation factor, it cannot be free of the drawback that the deviation in the output level of the carrier chroma signal of that band pass amplifier is enlarged when the over-saturation or the like is to be prevented.

It is therefore an object of the present invention to solve the aforementioned problems and to provide a chroma signal gain control circuit which has a simple construction, but can prevent disadvantages due to variation in the ratio of the color burst signal to the carrier chroma signal.

According to the present invention, on the other hand, there can be provided a chroma signal gain control circuit which avoids the need to increase the number of external components in the monolithic integration while improving the degree of integration.

According to the present invention, moreover, there can be provided a chroma signal gain control circuit which can reduce the deviation when the output level is to be set.

According to a fundamental feature of the present invention, the burst signal or the amplified band pass output signal is selectively fed to one ACC detecting circuit, by the output of which the gain of the band pass amplifier is controlled.

BRIEF DESCRIPTION OF THE DRAWING

FIG. 1 is a block diagram showing one embodiment of the present invention;

FIG. 2 is a gain characteristic graph illustrating the operations of the embodiment of the present invention; and FIG. 3 is a detailed circuit diagram showing one embodiment of the present invention.

DESCRIPTION OF THE PREFERRED EMBODIMENTS

The present invention will be described in detail in connection with a preferred embodiment thereof, as illustrated in FIG. 1. A first band pass amplifier 1, having a variable gain function, has its input connected to receive a color burst signal and a chroma signal $V_{IN}$ thereby to generate an amplified output. This output is fed to a second band pass amplifier 2, from which an output signal $V_{OUT}$ is generated.

The output of the aforementioned second band pass amplifier 2 is fed to a burst gate circuit 3, from the output of which only a color burst signal B is extracted. And, either this burst signal B or the burst and chroma signals B+C, i.e., the aforementioned second amplified band pass output, is selectively fed through a switch circuit 5 to an ACC detecting circuit 4, by the detected output of which the gain of the aforementioned first band pass amplifier 1 is controlled. A condenser $C_1$ constitutes the aforementioned detecting circuit, and a condenser $C_2$ provided at the input thereof is a coupling condenser.

In the operation of the circuit of FIG. 1, if the switch circuit 5 is set at the side a, for example, the ACC detecting circuit 4 receives only with the burst signal B so that the first band gain control operation dependent upon the detected output serves to hold the aforementioned burst signal at a predetermined level. As a result, the accurate chroma saturation factor (or simply the chroma) can be attained by making the aforementioned color burst signal level constant so long as the level ratio (or C/B) of the color burst signal and the chroma signal is kept at a preset color broadcasting standard.

However, when the aforementioned ratio C/B exceeds a predetermined value, the gain of the first band pass amplifier 1 is controlled to a relatively-large value by the actions of both the switch circuit 5 set at the side a and the ACC detecting circuit 4 so that the amplitude of the chroma signal C is compressed (or over-saturated) in the output $V_{OUT}$ of the second band pass amplifier 2.

In case such over-saturation of the chroma signal takes place, the switch circuit 5 is manually set at the side b. Then, the ACC detecting circuit 4 receives the combined color burst and chroma signals B+C. In this case, the output of the ACC detecting circuit 4, which performs a peak detecting operation, is generated in accordance with the higher input level. As a result, if the ratio (C/B) of the color burst signal to the chroma signal is increased with respect to the preset broadcasting standard, for example, the aforementioned ACC detected output performs gain control in accordance with the carrier chroma signal so that the over-saturation can be prevented.

In the embodiment being described, more specifically, the change in the aforementioned ratio C/B with respect to the broadcasting standard and the gain characteristics $G_V$ behave as shown by the solid line a in FIG. 2, if the switch circuit 5 is set at the side a, and as shown by broken line b if the switch circuit 5 is set at the side b.

As has been described hereinbefore, the viewer can select the preferred picture (which is not chromatically unnatural) by the use of the switch circuit 5 in accordance with the output of the received signal from the station or from a VTR Video Tape Recorder.

In the circuit thus embodied, since the aforementioned two kinds of automatic chroma saturation factor controls are performed by the single ACC detecting circuit and the single gain control circuit, the circuit can be simplified, while adding a similar function, as compared to the aforementioned circuits which are disclosed in Japanese Laid-Open Publications Nos. 49-57725 and 53-134325.

Moreover, since the gain control operation is performed with the use of the same feedback loop, the deviation in the level setting can be reduced to a low level. Further, since the aforementioned circuit can be simplified and constructed of only one ACC detecting circuit, when monolithic integration is to be effected, it is possible to prevent an increase in the number of the external condenser $C_1$ and the external terminals which constitute the ACC detecting circuit. Furthermore, since the coupling condenser $C_2$ is provided at the output side of the switch circuit 5, even where it is monolithically integrated, so that it may be commonly used for both the detected inputs, the increase in the occupation area can be minimized to reduce the production cost.

FIG. 3 is a detailed circuit diagram showing one embodiment of the present invention. In this embodiment, the portion indicated as single-dotted line in FIG. 3 is to be monolithically integrated, and the major circuits corresponding to the aforementioned circuit blocks 1 to 5 in FIG. 2 are enclosed by broken lines.

In the first band pass amplifier 1, an amplifying transistor $Q_{13}$ has its base connected to receive the input signal $V_{IN}$ and its collector connected to the emitters of two differentially-connected transistors $Q_9$ and $Q_{10}$, the conductions of which are controlled to generate a gain-controlled output. In this case, in order to prevent the DC output level from being changed in accordance with changes in the conductivities of the aforementioned transistors $Q_9$ and $Q_{10}$, differential transistors $Q_{11}$ and $Q_{12}$ are connected at their common emitter to the series combination of a transistor $Q_{14}$, for generating a DC current, and a resistor $R_9$, the transistors $Q_{11}$ and $Q_{12}$ being controlled by the same gain control voltage, while being fed with a DC gain control output of the opposite phase, so that only the AC output may be changed. More specifically, a DC component, which is inversely proportional to the conductivities of the transistors $Q_9$ and $Q_{10}$, is generated by the transistors $Q_{11}$ and $Q_{12}$ and is applied so that the DC component of the gain control output is made constant.

A first emitter-follower circuit is composed of the series circuit, including a resistor $R_1$, series diodes $Q_1$ to $Q_5$ (which may include diode-connected transistors, as will be the same hereinafter) and a resistor $R_2$, connected to the base of a transistor $Q_6$ having its emitter connected to resistor $R_3$ and from which an output is derived based on the voltage of the series circuit. This first emitter-follower circuit constitutes a bias circuit provided to generate the base bias voltage to the aforementioned differential transistors $Q_9$ and $Q_{12}$. Moreover, resistors $R_4$ and $R_5$ and a level shift diode $Q_7$ are interposed between the aforementioned bias voltage terminal and the later-described ACC detected output from detector 4, so that the ACC detected output is impressed as a gain control signal upon the base of the aforementioned differential transistors $Q_{10}$ and $Q_{11}$ through a second emitter-follower circuit which is composed of a transistor $Q_8$ having a resistor $R_6$ connected to the emitter thereof. In other words, the voltage drop at the resistor $R_5$ acts as the voltage for controlling the conductivities of the differential transistors $Q_9$ and $Q_{10}$ and the differential transistors $Q_{11}$ and $Q_{12}$.

In the second band pass amplifier 2, the aforementioned gain control output is fed to the bases of the amplifying transistors $Q_{17}$ and $Q_{18}$ through the emitter-follower circuit, which is composed of a transistors $Q_{15}$ having its emitter connected to resistor $R_{22}$ and its base connected to resistor $R_{13}$. To the emitters of these amplifying transistors $Q_{17}$ and $Q_{18}$ there are respectively connected a first current source circuit composed of resistors $R_{17}$ and $R_{18}$ and a transistor $Q_{19}$, and a second current source circuit composed of resistors $R_{19}$ and $R_{20}$ and a transistor $Q_{20}$. Still, moreover, emitter resistors $R_{14}$ and $R_{15}$ for setting the gain of the respective transistors $Q_{17}$ and $Q_{18}$ are provided, which are connected in common to an external condenser $C_3$ so as to be grounded in an AC manner.

On the other hand, the DC voltage at the intermediate point (or the AC grounded point) of the aforementioned emitter resistors $R_{14}$ and $R_{15}$ is fed as a biasing feedback voltage to the base of the amplifying transistor $Q_{13}$ in the aforementioned first band pass amplifier 1 and to the base of the DC current preparing transistor $Q_{14}$ through an emitter-follower circuit composed of a base resistor $R_{16}$, a transistor $Q_{16}$ and a resistor $R_{12}$. The voltage of the aforementioned intermediate point is further fed to the base of a transistor $Q_{21}$ for preparing the DC current at the later-described burst gate circuit 3.

The collector of the amplifying transistor $Q_{17}$ in the aforementioned second band pass amplifier 2 is connected with the commonly-connected emitters of the differential transistors $Q_{23}$ and $Q_{24}$ of the burst gate circuit 3 and further with a collector resistor $R_{26}$ through the transistor $Q_{23}$ which is rendered conductive especially by the impression of a gate pulse $P_G$. In order to prevent the DC output level from being changed in response to the conduction and non-conduction of the aforementioned differential transistors $Q_{23}$ and $Q_{24}$, the collector output of the transistor $Q_{21}$ for preparing the aforementioned DC current is impressed upon the common emitter of differential transistors $Q_{25}$ and $Q_{26}$, and the aforementioned burst gate control signal $P_G$ is impressed upon the base of the transistor $Q_{25}$ thereby to generate an output of the opposite phase. As a result, at the collector of the transistor $Q_{23}$, there can be generated only the color burst signal B due to the gain, which is set by the resistors $R_{26}$ and $R_{14}$, when the transistor $Q_{23}$ is rendered conductive, and a preset DC voltage due to the current, which is generated by the transistor $Q_{21}$ and flows through the transistor $Q_{25}$, which is conducting at that time, when the transistor $Q_{23}$ is rendered non-conductive. On the other hand, the transistor $Q_{24}$ is kept conductive, except during the color burst period.

To the collector of the amplifying transistor $Q_{18}$ of the aforementioned second band pass amplifier 2, on the other hand, there is connected a resistor $R_{23}$ which constitutes a collector load resistor and which is connected in turn to the emitter of a transistor $Q_{22}$ which is fed with a preset bias voltage. A resistor $R_{27}$ receives the color burst signal and the chroma output $V_{OUT1}$ generated at the collector of the transistor $Q_{18}$. Thus, the color burst and chroma signals B+C, which are divided by the collector resistors $R_{27}$, $R_{23}$ and so on are generated.

At the power source voltage side terminals of the collector resistors $R_{26}$ and $R_{27}$ of the aforementioned amplifying transistors $Q_{17}$ and $Q_{18}$, moreover, there are provided transistors $Q_{27}$ and $Q_{39}$ which are connected to a preset voltage. More specifically, the aforementioned transistors $Q_{27}$ has its base connected to receive the divided voltage, which is prepared by the bias circuit constructed of the series circuit composed of resistors $R_{28}$ to $R_{32}$ and diodes $Q_{29}$ and $Q_{30}$, so that the DC output level of the aforementioned color burst signal B may take a level of about 9.08 V, for example.

At the base of the aforementioned transistors $Q_{39}$, on the other hand, there is provided a series circuit which is composed of resistors $R_{38}$ and $R_{39}$ and a switching transistor $Q_{40}$. The resistances of the resistors $R_{27}$ and $R_{38}$ are so especially set that the DC output level of the aforementioned color burst and chroma signals B+C may take a value of about 7.69 V, for example, when the switching transistor $Q_{40}$ is rendered conductive by a switch SW provided as an external circuit, and may take a value of about 10.49 V when the switching transistor $Q_{40}$ is rendered non-conductive.

The offset voltage, which is fed as the bias voltage from the emitter of a transistor $Q_{31}$ having its base fed with a preset divided voltage to the bases of the transistors $Q_{24}$ and $Q_{25}$ of the burst gate circuit 3 through a resistor $R_{24}$ and which is prepared by a level shift diode $Q_{32}$, is fed as the bias voltage to the bases of the transistors $Q_{23}$ and $Q_{26}$ of the burst gate circuit. Moreover, the aforementioned differential transistors $Q_{24}$ and $Q_{25}$ have their bases connected to receive the fly-back pulse, which is synchronized with the black-out period, such as the gate pulse $P_G$ through a resistor $R_{25}$ so that the aforementioned gate operation may be effected while maintaining the bases of those transistors $Q_{24}$ and $Q_{25}$ at a low level during the burst period.

The switch circuit 5 is composed of the differential transistors $Q_{34}$ and $Q_{35}$, which are connected to receive the color burst and chroma signals B+C and the color burst signal B, respectively, and which have their common emitter connected to a resistor $R_{34}$ so that either of the aforementioned two signals is transmitted.

These switching operations are effected in the following manner. When the transistor $Q_{40}$ receives at its base a conducting voltage (e.g., $V_{CC}$) by way of the switch SW provided as an external circuit, it is rendered conductive so that the DC level of the aforementioned carrier signal B+C to be fed to the transistor $Q_{34}$ of the aforementioned switch circuit 5 takes the value of 7.69 V, as has been described above. As a result, the transistor $Q_{35}$ is rendered conductive whereas the transistor $Q_{34}$ is rendered nonconductive, in contrast to the condition when the transistor $Q_{35}$ receives the burst signal B superposed upon the aforementioned DC level of 9.08 V. As a result, the burst signal B can be generated as the output of the switch circuit 5.

On the other hand, when the aforementioned transistor $Q_{40}$ is rendered nonconductive, the DC level of the aforementioned color burst and chroma signals B+C rises to the value of 10.49 V. As a result, the transistor $Q_{34}$ is rendered conductive, whereas the transistor $Q_{35}$ is rendered nonconductive so that the color burst and chroma signals B+C can be generated as the output of the switch circuit 5.

Both the selected outputs of the switch circuit 5 are fed in the form of an AC component having its DC component removed by the coupling condenser $C_2$ constituted of the MOS capacity to the ACC detecting circuit 4.

This ACC detecting circuit 4 is constructed, in the form of a peak detecting circuit, of a differential amplifier, made up of differentially-connected transistors $Q_{37}$ and $Q_{38}$, an emitter resistor $R_{35}$ and a collector resistor $R_{41}$, of a transistor $Q_{41}$ to be fed with the output of the differential amplifier, and of the external condenser $C_1$. The peak value held in the condenser $C_1$ is generated through an output circuit, which is formed of a transistor $Q_{42}$, an emitter resistor $R_{36}$, a resistor $R_{37}$ and a diode $Q_{43}$, and is used as the gain control signal of the aforementioned first band pass amplifier 1.

In this embodiment, since the two amplifying transistors $Q_{17}$ and $Q_{18}$ are used as the second band pass amplifier 2 thereby to set their respective intrinsic gains, the gradients of the characters a and b as shown in FIG. 2, between the changes of the aforementioned ratio C/B relative to the broadcasting standard and the amplified band gain $G_V$ can be set independently of each other. Moreover, since the switching operations are effected by changing the DC level of the color burst and chroma signals B+C to be fed to the switch circuit 5, this circuit can be provided as a simplified differential transistor circuit.

The present invention should not be limited to the embodiments thus-far described, but the specific circuit construction, as shown in FIG. 3, can be modified in various forms. On the other hand, the monolithic IC constituting the aforementioned chroma signal gain control circuit can be equipped with an additional circuit such as a chroma synchronizing circuit, a chroma demodulating circuit or a color killer circuit.

While we have shown and described one embodiment in accordance with the present invention, it is understood that the invention is not limited to the details shown and described, but is susceptible of numerous changes and modifications as known to one of ordinary skill in the art, and we therefore do not wish to be limited to the details shown and described herein but intend to cover all such changes and modifications as are obvious to those skilled in the art.

What is claimed is:

1. A chroma signal gain control circuit comprising: a first band pass amplifier having a variable gain function; a second band pass amplifier connected to receive at its input the amplified output of the first band pass amplifier; a burst gate circuit connected to receive at its input the amplified output of the second band pass amplifier; switch circuit means for selectively transmitting either the output of said burst gate circuit or the output of the second band pass amplifier to the output thereof; and an ACC detecting circuit connected to receive the output of said switch circuit means for generating a gain control signal which is applied in control of said first band pass amplifier.

2. A chroma signal gain control circuit as set forth in claim 1, wherein said burst gate circuit includes means responsive to a gate pulse for generating a color burst signal at its output.

3. A chroma signal gain control circuit as set forth in claim 2, wherein said ACC detecting circuit includes a peak detecting condenser.

4. A chroma signal gain control circuit as set forth in claim 3, wherein said switch circuit means has its output connected to the input of said ACC detecting circuit through a coupling condenser.

5. A chroma signal gain control circuit as set forth in claim 4, wherein both said coupling condenser and at least a portion of each of the first band pass amplifier, the second band pass amplifier, said burst gate circuit, said switch circuit means and said ACC detecting circuit are formed in a monolithic integrated circuit, and wherein the peak detecting condenser of said ACC detecting circuit is an external condenser.

6. A chroma signal gain control circuit as set forth in claim 5, wherein said switch circuit means includes first and second transistors having their emitters commonly connected, said first transistor having its base connected to the output of said burst gate circuit, said second transistor having its base connected to the output of the second band pass amplifier, and the common emitter of the first and second transistors being connected to the input of said ACC detecting circuit through said coupling condenser.

7. In a color television receiver, the improvement comprising:
a first band pass amplifier;
a second band pass amplifier having its input connected with the output of the first band pass amplifier;
a burst gate circuit having its input connected to the output of the second band pass amplifier;
switch circuit means for selectively transmitting either the output of said burst gate circuit or the output of the second band pass amplifier to the output thereof; and
an ACC detecting circuit for controlling the gain of the first band pass amplifier in accordance with the output of said switch circuit means.

8. The combination defined in claim 7, wherein said switch circuit means includes a manually-operable switch.

9. A chroma signal gain control circuit as set forth in claim 7, wherein said burst gate circuit includes means responsive to a gate pulse for generating a color burst signal at its output.

10. A chroma gain control circuit as set forth in claim 7, wherein said ACC detecting circuit includes a peak detecting condenser.

* * * * *